US012720560B2

(12) United States Patent
Garigan et al.

(10) Patent No.: US 12,720,560 B2
(45) Date of Patent: Aug. 25, 2026

(54) CONFIGURATION OF AN EPHEMERAL SECURE WIRELESS AD-HOC NETWORK FOR PROGRAMMABLE DEVICES

(71) Applicant: Roper Solutions, Inc., Austin, TX (US)

(72) Inventors: Maeve Garigan, San Marcos, TX (US); Michael Pendley, Albuquerque, NM (US)

(73) Assignee: Roper Solutions, Inc., Austin, TX (US)

( * ) Notice: Subject to any disclaimer, the term of this patent is extended or adjusted under 35 U.S.C. 154(b) by 314 days.

(21) Appl. No.: 18/491,614

(22) Filed: Oct. 20, 2023

(65) Prior Publication Data

US 2024/0057102 A1 Feb. 15, 2024

Related U.S. Application Data

(63) Continuation-in-part of application No. 29/788,399, filed on May 14, 2021, now Pat. No. Des. 1,019,592.

(51) Int. Cl.

| | |
|---|---|
| ***H04W 72/23*** | (2023.01) |
| ***H04W 12/041*** | (2021.01) |
| ***H04W 52/02*** | (2009.01) |
| ***H04W 84/18*** | (2009.01) |

(52) U.S. Cl.

CPC ......... *H04W 72/23* (2023.01); *H04W 12/041* (2021.01); *H04W 52/0229* (2013.01); *H04W 84/18* (2013.01)

(58) Field of Classification Search

CPC ..... H04W 4/80; H04W 12/041; H04W 12/50; H04W 52/0229; H04W 72/23; H04W 84/18

See application file for complete search history.

(56) References Cited

U.S. PATENT DOCUMENTS

| | | | | |
|---|---|---|---|---|
| 7,791,415 | B2 | 9/2010 | Hornbuckle | |
| 8,254,581 | B2 * | 8/2012 | Wan | H04L 9/0825 380/278 |
| 9,967,741 | B2 | 5/2018 | Su et al. | |
| 10,038,768 | B2 | 7/2018 | Ames et al. | |
| 10,057,248 | B2 | 8/2018 | Zhang | |
| 10,110,697 | B2 * | 10/2018 | Fransen | H04W 4/029 |
| 10,164,776 | B1 | 12/2018 | Perdomo | |
| 10,313,925 | B2 | 6/2019 | Jones et al. | |
| 10,602,424 | B2 | 3/2020 | Perdomo | |
| D881,835 | S | 4/2020 | Scherrer et al. | |

(Continued)

FOREIGN PATENT DOCUMENTS

WO WO-2019170810 A1 * 9/2019 ............. A63F 13/92

OTHER PUBLICATIONS

Gotenna, "goTenna PRO Spec Sheet for Pro & Pro X," Aug. 6, 2020, 1 page.

(Continued)

*Primary Examiner* — Eric Nowlin

(74) *Attorney, Agent, or Firm* — Cabello Hall & Zinda, PLLC

(57) ABSTRACT

An ephemeral secure wireless ad hoc network for programmable devices uses a technique for reading an encoded identification value disposed with a housing of the programmable device. A software application uses the read encoded identification value to configure the programmable device for use in the network. When the network is shut down, all network session information is erased for security purposes.

22 Claims, 9 Drawing Sheets

(56) References Cited

U.S. PATENT DOCUMENTS 10,635,802 B2 4/2020 Zhang et al.
10,944,669 B1 3/2021 Ramanathan et al.
10,966,155 B1* 3/2021 Kasslin ................. H04W 76/28
10,979,962 B2* 4/2021 Ramisetti ............. H04B 17/318
11,032,768 B2* 6/2021 Li ..................... H04W 52/0225
11,063,760 B2* 7/2021 Subba ..................... H04L 9/085
11,363,539 B1 6/2022 Fitz et al.
11,435,810 B1* 9/2022 Krishnakumar ...... G06F 1/3278
11,549,837 B2* 1/2023 Klicpera ................. G01M 3/26
D982,021 S 3/2023 Daneshvar et al.
11,626,974 B2 4/2023 Zimmerman et al.
11,632,371 B2 4/2023 Cano et al.
11,762,446 B2* 9/2023 Da Silva ................ G06N 3/006 713/323
11,907,039 B2* 2/2024 Krishnakumar .. H04W 52/0212
11,948,444 B2* 4/2024 Guzelgunler .......... G08B 7/068
12,069,174 B2* 8/2024 Montemurro ......... H04L 9/3263
2012/0008787 A1* 1/2012 Wan ...................... H04L 9/0825 380/285
2012/0059928 A1* 3/2012 Lee ....................... G06F 9/4843 709/224
2012/0173612 A1* 7/2012 Vegesna-Venkata ........................ H04L 67/143 709/203
2012/0280789 A1* 11/2012 Gerhardt ............ G07C 9/00571 340/5.61
2012/0280790 A1* 11/2012 Gerhardt ............ G07C 9/00571 340/5.61
2013/0127618 A1* 5/2013 Sheleheda ........... H04L 41/0631 340/540
2013/0271288 A1* 10/2013 Liang .................... H04W 28/16 340/870.01
2014/0051378 A1 2/2014 Daneshrad et al.
2014/0369449 A1 12/2014 Shah et al.
2015/0102906 A1* 4/2015 Gerhardt ............. H04L 63/0492 340/5.61
2016/0018895 A1* 1/2016 Sidi ................... H04M 1/72436 715/752
2016/0121487 A1* 5/2016 Mohan ................... B25J 9/0084 700/250
2016/0191496 A1* 6/2016 Zhang ..................... G06F 21/42 726/5
2017/0126834 A1* 5/2017 Fransen ................ H04L 67/303
2018/0005295 A1* 1/2018 Howell .............. G06Q 30/0631
2018/0124704 A1* 5/2018 Jung ................. H04W 52/0229
2018/0182491 A1* 6/2018 Belliveau ........... A61B 5/14503
2019/0268906 A1 8/2019 Perdomo
2020/0067708 A1* 2/2020 Subba ................... H04L 9/3226
2020/0107241 A1* 4/2020 Ramisetti ............. H04B 17/318
2020/0220788 A1 7/2020 Ramanathan et al.
2020/0259650 A1* 8/2020 Montemurro ........... H04L 9/321
2020/0260464 A1 8/2020 Zhu et al.
2021/0142912 A1* 5/2021 Belliveau ............... G16H 20/17
2021/0176822 A1 6/2021 Perdomo
2021/0191495 A1* 6/2021 Dasilva .................. G06N 3/045
2021/0367878 A1 11/2021 Ramanathan et al.
2021/0367889 A1 11/2021 Ramanathan et al.
2022/0165146 A1 5/2022 Daoura et al.
2022/0308652 A1* 9/2022 Krishnakumar ...... G06F 1/3259
2022/0345855 A1* 10/2022 May ........................ H04W 4/06
2022/0385547 A1 12/2022 Daneshvar et al.
2022/0393710 A1 12/2022 Rachid
2023/0009721 A1* 1/2023 Laakkonen ............. H04W 4/35
2023/0033786 A1 2/2023 Rachid et al.
2023/0180026 A1 6/2023 Deixler et al.
2023/0232231 A1 7/2023 Deixler et al.
2024/0005769 A1* 1/2024 Guzelgunler ........ G08B 21/084

OTHER PUBLICATIONS

Gotenna, "goTenna PRO-X + ATAK," Jun. 6, 2022, 1 page.
Heeger et al., "Secure Energy Constrained LoRa Mesh Network," AdHoc-Now 2020 : The 19th International Conference on Ad Hoc Networks and Wireless, Oct. 2020, pp. 228-240, Springer Nature Switzerland AG, https://doi.org/10.1007/978-3-030-61746-2_17.
Int'l Search Report and Written Opinion in PCT/US2023/077489 dated May 17, 2024, 11-pgs.

* cited by examiner

CONFIGURATION OF AN EPHEMERAL SECURE WIRELESS AD-HOC NETWORK FOR PROGRAMMABLE DEVICES

CROSS-REFERENCE TO RELATED APPLICATION

This patent application claims priority to U.S. Design patent application Ser. No. 29/788,399 filed on May 14, 2021, entitled "Wearable Radio Communication Device." The disclosure of the prior application is considered part of and is incorporated by reference into this patent application.

TECHNICAL FIELD

The present invention relates to the field of wireless networking, and in particular to systems and techniques for configuring ephemeral secure wireless ad hoc networks for programmable devices.

BACKGROUND ART

One problem faced by some entities is keeping workers connected and protected in remote off-grid areas where cellular service or Wi-Fi are not available and satellite-based communications may be inconvenient or not available. In addition to workers, outdoors enthusiasts such as hunters, hikers, and mountain bike riders are in such areas. This lack of readily available communications services makes it difficult or impossible to rapidly communicate critical and potentially life-saving information to team members, such as personnel location, personnel activity, or messages containing time-sensitive information.

Workers whose job involves work in remote areas include farm and ranch hands, oilfield workers, and forestry workers. Ranch workers are often alone in remote rangelands conducting difficult and dangerous work, exposed to treacherous terrain, extreme weather, and dangerous animals. Oil and gas workers are often in a similar position, such as workers in the remote areas of the 86,000 square mile Permian Basin and the 7,500 square mile San Juan Basin located in New Mexico. Forestry workers are often alone in remote forests with difficult terrain, poor visibility, and a heightened risk of injury due to the nature of their work.

In urban areas, incident commanders involved in emergency management operations need to coordinate and keep tabs on a diverse group of first responders as they arrive and deal with the emergency situation at hand. In such situations, Wi-Fi, cell service, or even satellite service may be unavailable due to network congestion or damage to infrastructure. This creates a critical need for a communications system that provides first responders with instant interoperability and does not depend upon existing infrastructure.

The lack of resilient, intuitive, and automated long-range communication for workers in remote environments not only creates significant inefficiencies in managing daily work, it also dramatically increases the risk of permanent injury or death if a worker comes in harm's way doing their dangerous and difficult job.

SUMMARY OF INVENTION

In one aspect, an ephemeral secure wireless ad hoc network of programmable devices comprises a plurality of programmable devices, each comprising: a housing, in which is disposed: a short-range radio transceiver; a long-range radio transceiver; a long-range radio antenna; and sensors for data collection; and an encoded device identifier, disposed with the housing; and a configuring device, comprising: a short-range radio transceiver; a reader for the encoded device identifier; a display; a software application for execution by the configuring device, comprising instructions that when executed cause the configuring device to: establish a data communication connection between the configuring device and the programmable device via their respective short-range radio transceivers; send an interrupt signal to a programmable device to wake the programmable device from a low-power sleep state to a configuration state; read the encoded device identifier; send configuration information via the data communication connection; and send a command to the programmable device from the configuring device via the data communication connection, causing the programmable device to transition from the configuration state to an operational state.

In a second aspect, a software application for configuring a programmable device into an ephemeral secure wireless ad hoc network, comprising instructions that when executed cause a configuring device to establish a data communication connection between the configuring device and the programmable device; send an interrupt signal to a programmable device to wake the programmable device from a low-power sleep state to a configuration state; read an encoded device identifier disposed with the programmable device; send configuration information via the data communication connection; and send a command to the programmable device from the configuring device via the data communication connection, causing the programmable device to transition from the configuration state to an operational state.

In a third aspect, a method of configuring a programmable device into an ephemeral secure wireless ad hoc network comprises reading by a configuring device an encoded device identifier disposed with a housing of a programmable device; establishing a data communication connection between the configuring device and the programmable device based on the encoded device identifier; sending an interrupt signal via the data communication connection from the configuring device to the programmable device; waking the programmable device from a low-power sleep state responsive to receiving the interrupt signal and transitioning the programmable device into a configuration state; sending configuration information via the data communication connection from the configuring device to the programmable device; and sending a command via the data communication connection from the configuring device to the programmable device, causing the programmable device to complete configuration and transition to an operational state.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

Figure 1:
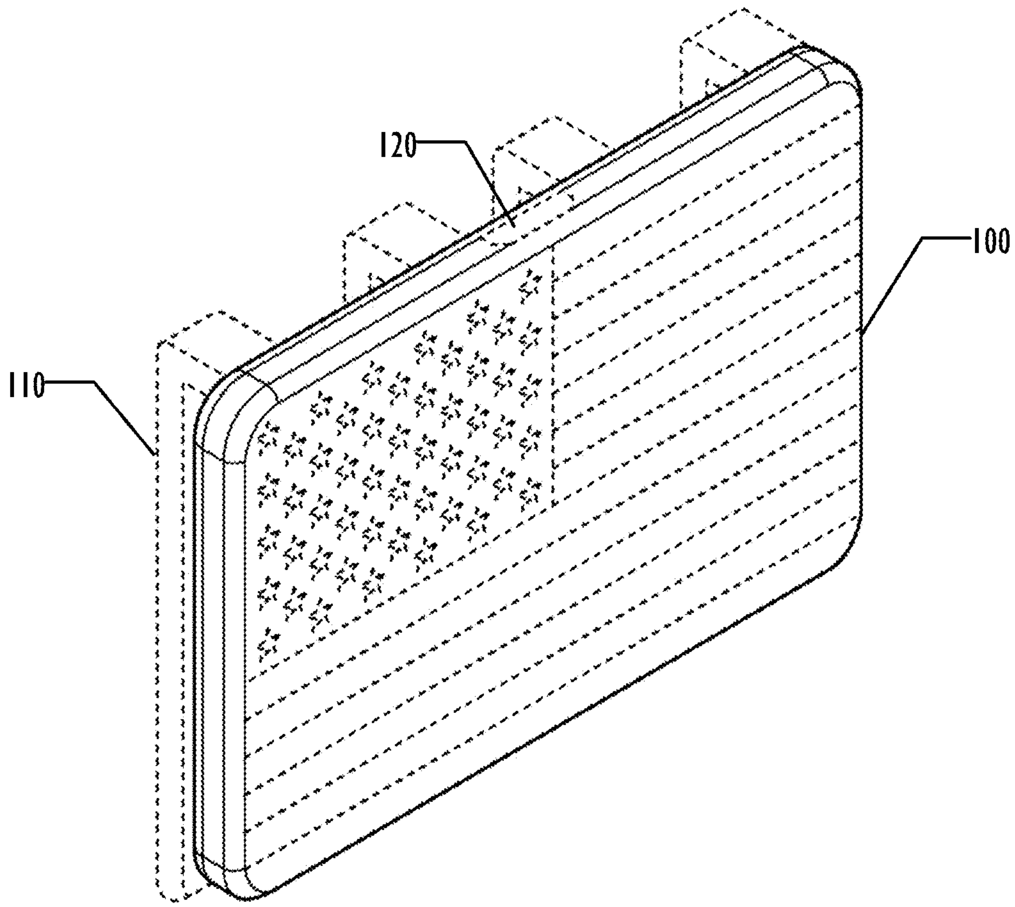
FIG. 1 is an isometric view of a programmable communication device according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts are understood to reference all instances of subscripts corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments can implement the features and functionality described herein in software, firmware, or hardware as desired, including any combination of software, firmware, and hardware. References to daemons, drivers, engines, modules, or routines should not be considered as suggesting a limitation of the embodiment to any type of implementation. The actual specialized control hardware or software code used to implement these systems or methods is not limiting of the implementations. Thus, the operation and behavior of the systems and methods are described herein without reference to specific software code with the understanding that software and hardware can be used to implement the systems and methods based on the description herein.

As used herein, satisfying a threshold may, depending on the context, refer to a value being greater than the threshold, greater than or equal to the threshold, less than the threshold, less than or equal to the threshold, equal to the threshold, or the like, depending on the context.

Although particular combinations of features are recited in the claims and disclosed in the specification, these combinations are not intended to limit the disclosure of various implementations. Features may be combined in ways not specifically recited in the claims or disclosed in the specification.

Although each dependent claim listed below may directly depend on only one claim, the disclosure of various implementations includes each dependent claim in combination with every other claim in the claim set. No element, act, or instruction used herein should be construed as critical or essential unless explicitly described as such.

A collection of programmable devices such as those described below can be used to create an ephemeral secure wireless ad hoc network, enabling users to send text messages, share geolocation and map information, and monitor the activity of teammates, all without the need for existing infrastructure or access to cellular service, Wi-Fi, or satellite. The approach described below aims to maximize the number of users (nodes) within a given network while maintaining overall system usability and operability, and ensuring that network data communications are reliable, secure, and private. The network of devices dramatically enhances worker safety with automated updates on worker location and activity, thus providing remote "wellness checks" so teammates can maintain awareness of each team member's location and activity status. This awareness enables the rapid and efficient rendering of rescue operations and medical aid, which is critical and potentially life-saving when a teammate is hurt and unable to send a message asking for help or unable to activate an emergency beacon. Frequent, automated, and accurate location and activity tracking through a wireless network further enhances safety and efficiency by enabling the team to focus on the task at hand and minimize the need for additional communication.

In one embodiment, each programmable device is a waterproof smart programmable device using wireless charging that is formed as a wearable device to integrate into the user's individual equipment by attaching to a piece of apparel such as a vest, plate carrier, or backpack. An example implementation of a programmable device 100 is illustrated in FIG. 1, in this example in a rounded rectangular housing with a flag design formed on the front of the programmable device 100. Some embodiments may, either as an alternate or as an addition, allow charging through a charging port, such as a Universal Serial Bus (USB) port 120. Example designs for the programmable device are illustrated in U.S. Des. Pat. App. No. 29/788,399 filed on May 14, 2021, entitled "Wearable Radio Communication Device." These examples are illustrative and the design of the device is not limited to those illustrated in that design patent application. The programmable device 100 is preferably lightweight and in some embodiments is roughly the size of a credit card.

Figure 2:
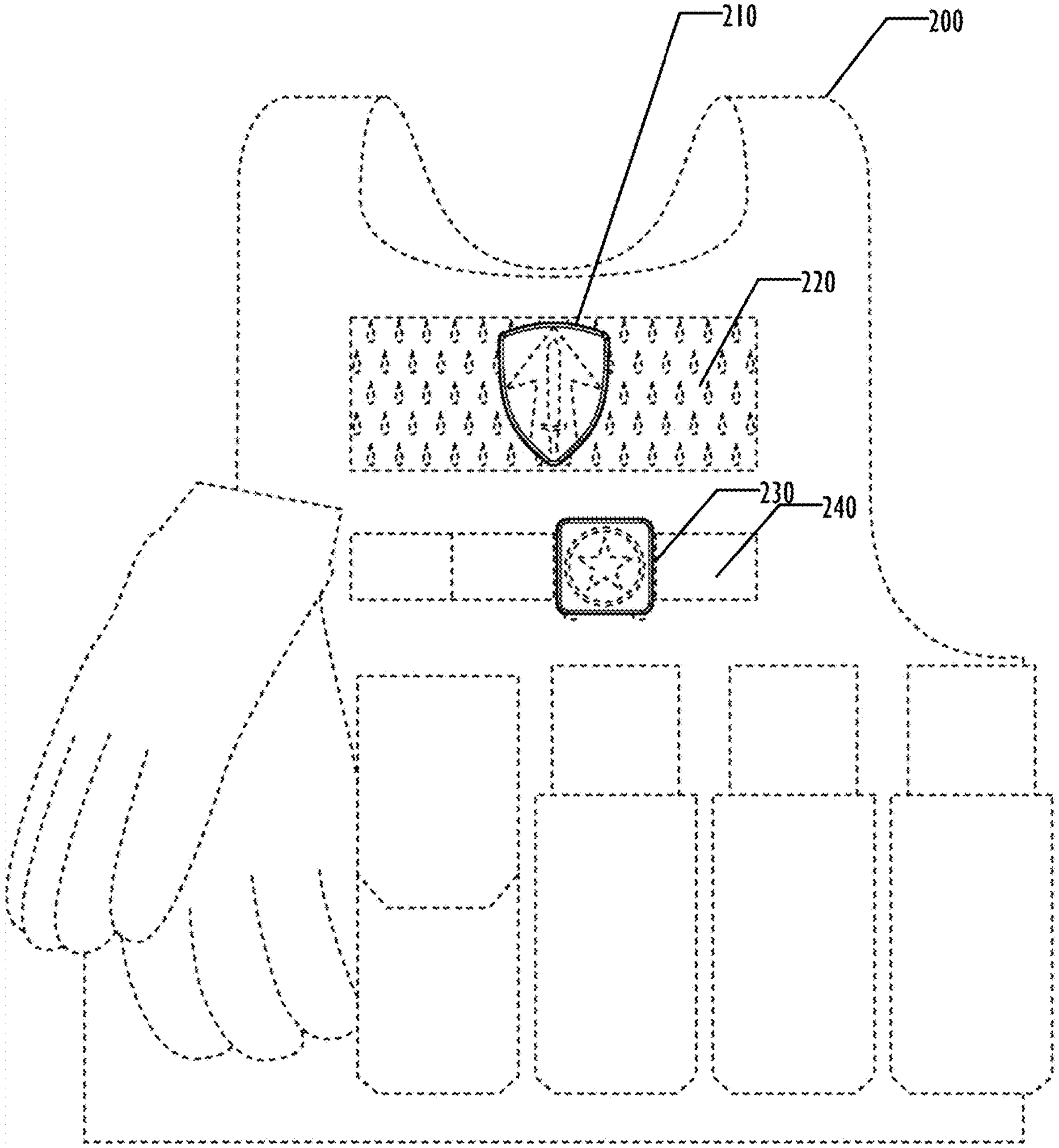
FIG. 2 is a front view of a plate carrier for attaching a programmable communication device according to one embodiment.

For the purposes of attaching the programmable device to a piece of apparel, such as a vest, a backpack, or the plate carrier 200 illustrated in FIG. 2, the programmable device 100 may employ any desired attachment technique. For example, clips 110 as illustrated in FIG. 1 may be used to attach the programmable device 100 to a Modular Lightweight Load-carrying Equipment (MOLLE) system of straps. Alternately, hook and loop fasteners may be attached to or formed on a portion of a housing of the programmable device 100 for attaching to a corresponding hook and loop area. In FIG. 2, a front view of a plate carrier 200, a programmable device 210 is attached to hook and loop area 220, and a differently shaped programmable device 230 is clipped to one of a series of straps 240 of the plate carrier 200 using clips like the clips 110 of FIG. 1. Any other technique known to the art may be used for disposing the programmable device 100 on or with a piece of apparel. For example, the programmable device 100 may be simply placed in a pocket or pouch of the piece of apparel.

Each programmable device 100 comprises a circuit board disposed within a housing. In one embodiment, the housing is waterproof according to the IP68 level of ingress protection as defined by the International Electrotechnical Commission (IEC) under the international standard IEC 60529. The IP68 level of ingress protection indicates the unit is dust tight and protected against immersion in water at 1 meter or more in depth. An internal rechargeable battery provides power to the electrical components disposed on the circuit board.

Each programmable device is manufactured with an encoded device identifier that is encoded with a unique identifier (UID) that is assigned uniquely to each programmable device by the manufacturer and can be read by a configuring device.

Figure 3:
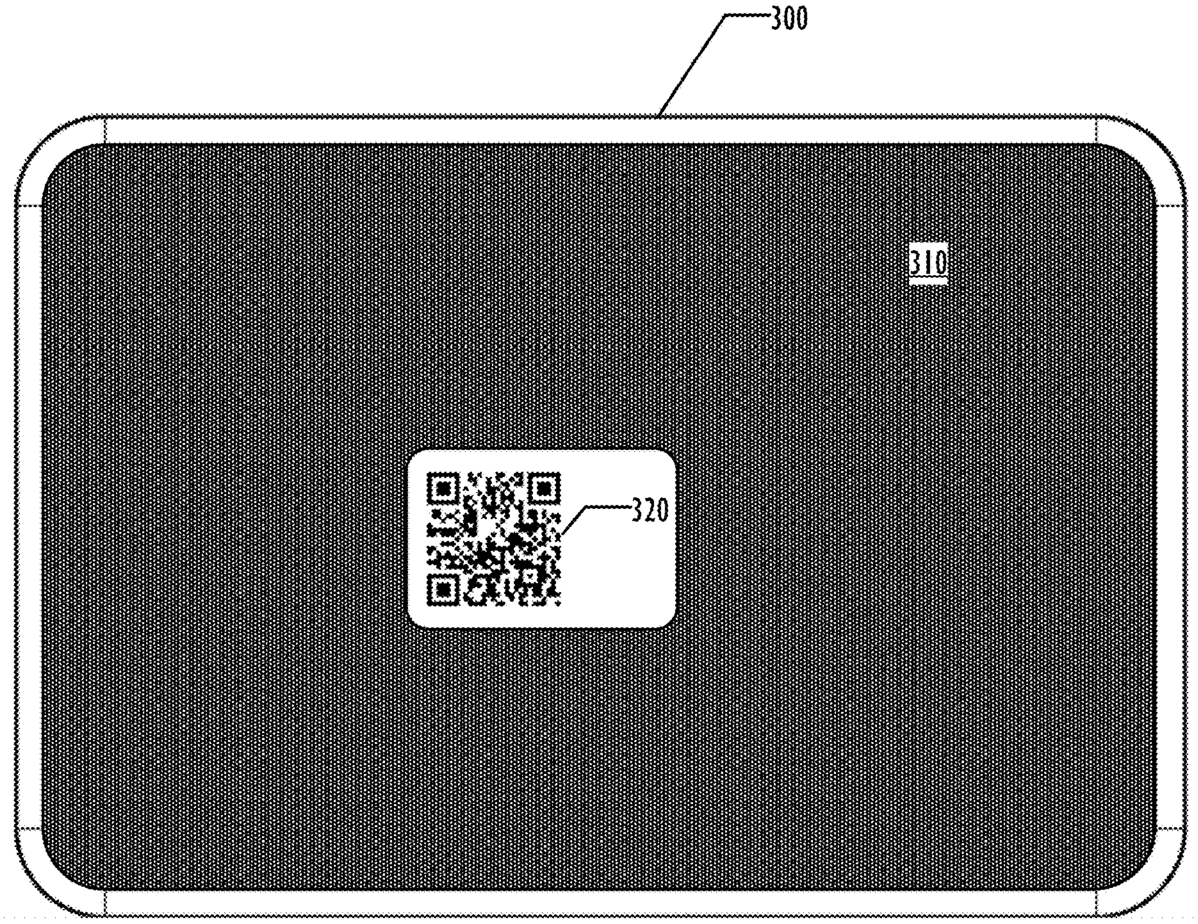
FIG. 3 is a back view of a programmable communication device according to one embodiment.

In one embodiment, illustrated in a back view in FIG. 3, the encoded device identifier 320 is optically readable on a surface of the housing of the programmable device 300. As illustrated in FIG. 3, the encoded device identifier 320 may be encoded in a barcode. Any type of barcode may be used, including a QR Code®. (QR CODE is a registered trademark of Denso Wave Incorporated.) Other types of encoded device identifiers may be used including other types of optically readable device identifiers or electronically readable device identifiers such as a Near Field Communication (NFC) tag. NFC is an international standard defined by ISO/IEC 18092 that specifies an interface and protocol for the wireless interconnection of devices for the digital exchange of data. Electronically readable device identifiers may be disposed either on the exterior of the housing or interior to the housing as desired.

Figure 4:
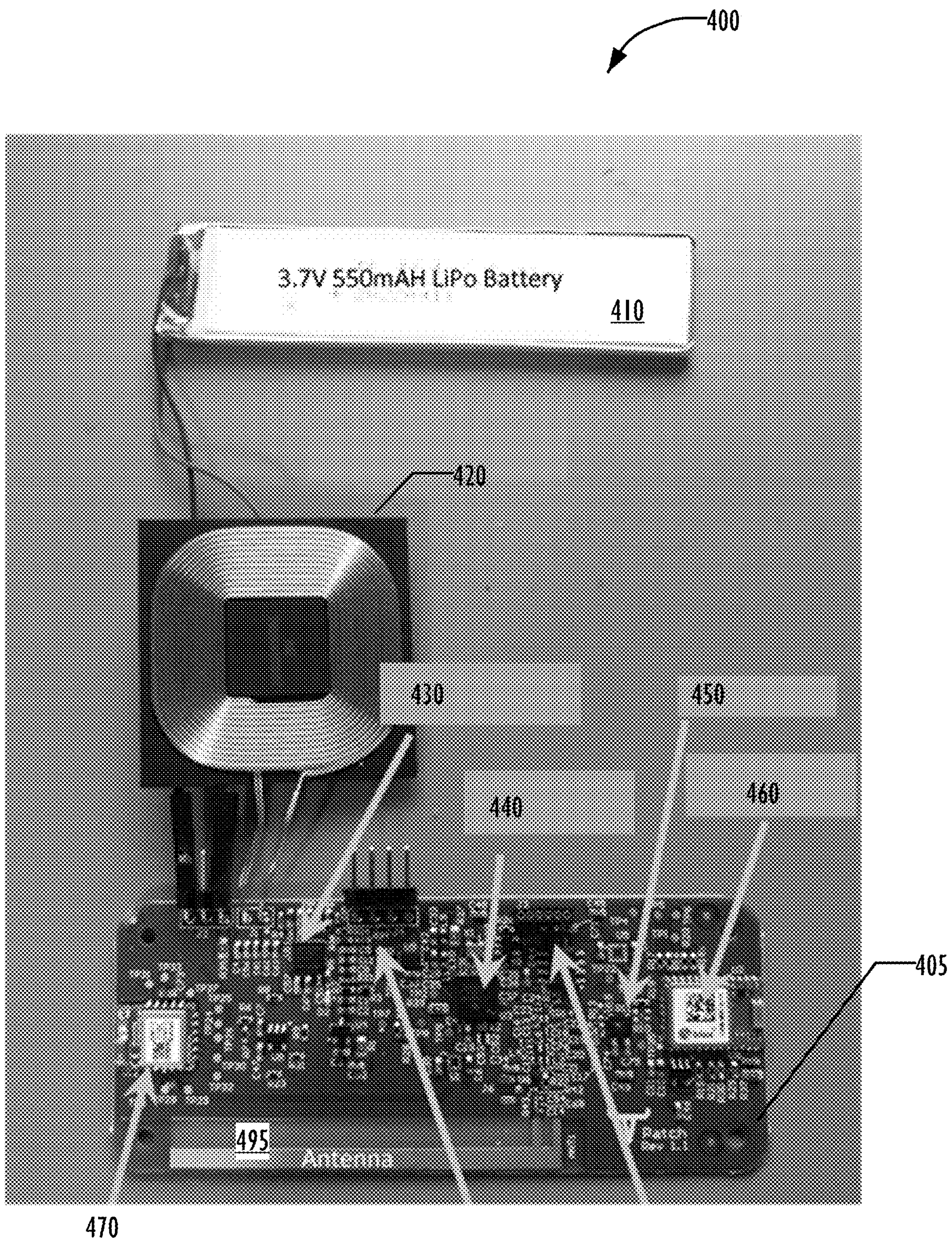
FIG. 4 is an exploded view of the electrical components of a programmable communication device according to one embodiment.

FIG. 4 is an exploded view of the electrical components of an example programmable device 100 removed from its housing according to one embodiment. In this example, the components 400 are disposed on or with a printed circuit board 405. A rechargeable battery 410 provides power to the components 400. The rechargeable battery 410 preferably should have enough charge capacity to provide power for 24 hours of use. A wireless charging coil 420 allows wireless charging of the battery 410 under the control of a wireless charging controller 430, preferably according to the QI® wireless charging standard. (QI is a registered trademark of the Wireless Power Consortium.) A processing element 440 provides computational capability for the programmable device 100 and may be a 32-bit ARM® or other type of microcontroller or processor. (ARM is a registered trademark of Arm Limited.) Firmware for execution by the processing element 440 is stored in non-volatile memory and provides programmable control of the programmable device 100.

The programmable device 100 further comprises sensors for data collection. An inertial measurement unit (IMU) 450 comprises a 3-axis accelerometer and a 3-axis gyroscope that can be used to detect movement, orientation, and angular velocity of the programmable device 100 (and thus of the wearer of the programmable device 100). This IMU data is used to determine the activity status of the wearer of the programmable device 100. A geolocation receiver 460 provides geolocation information to the processing element 440, allowing detection of the location of the programmable device 100 and its user. Preferably the geolocation receiver 460 is compatible with multiple Global Navigation Satellite Systems (GNSS), including the Global Positioning System (GPS) satellite-based radio navigation system operated by the United States Space Force. However, geolocation receivers compatible with other GNSS may be used. References to GPS in this disclosure should be understood to refer to any GNSS. In some embodiments, the geolocation receiver 460 is capable of receiving geolocation and global clock data from a plurality of satellite constellations concurrently.

In one embodiment, a short-range radio transceiver 470 provides short-range radio communication allowing the establishment of a personal area network that provides a data communication connection between the programmable device 100 and a programmable configuring device. The programmable configuring device comprises a display, a reader for reading the encoded device identifier, such as an optical scanner or camera, a software application comprising instructions for configuring the programmable device 100, and a short-range radio transceiver. Although the description below is written in terms of the use of BLUETOOTH® Low Energy (BLE) technology, embodiments can use other short-range communication technology, such as NFC. (BLUETOOTH is a registered trademark of the Bluetooth Special Interest Group.) Communications via BLE may be encrypted using an encryption method such as a 128-bit Advanced Encryption Standard (AES-128) technique. Although typically the configuring device is a smartphone executing a software application on a smartphone processor and using the smartphone's camera, other types of programmable configuring devices capable of optically or electronically reading the UID encoded in the encoded device identifier on the programmable device may be used.

A long-range radio antenna 495 provides long-range radio communication, typically using the Long Range (LoRa) radio modulation scheme developed by Semtech Corporation allowing the creation of a low-power wide area network (LPWAN). In one embodiment, a LoRa radio transceiver is embedded in the processing element 440, but other embodiments may use a separate chip for the long-range radio transceiver. The long-range radio communication range between each programmable device 100 using the long-range radio antenna 495 may be >1 km to 10 km depending on the long-range radio settings and the operational environment. All communication using the long-range radio transceiver is encrypted using an encryption method such as a 256-bit Advanced Encryption Standard (AES-256) with the unique encryption key for the ephemeral secure wireless ad hoc network being generated during the configuration of the network as described below.

To prevent the compromise of information sent over the ephemeral secure wireless ad hoc network, the programmable device 100 preferably does not contain memory or other storage components for long-term storage of data generated or communicated by the programmable devices. All data generated or communicated by the programmable device 100 is erased upon shutdown of the network to which the programmable device 100 was connected, as described in more detail below. In one embodiment, the programmable device 100 comprises neither a display for displaying information nor a data input element for keying or otherwise inputting data by its user.

Figure 5:
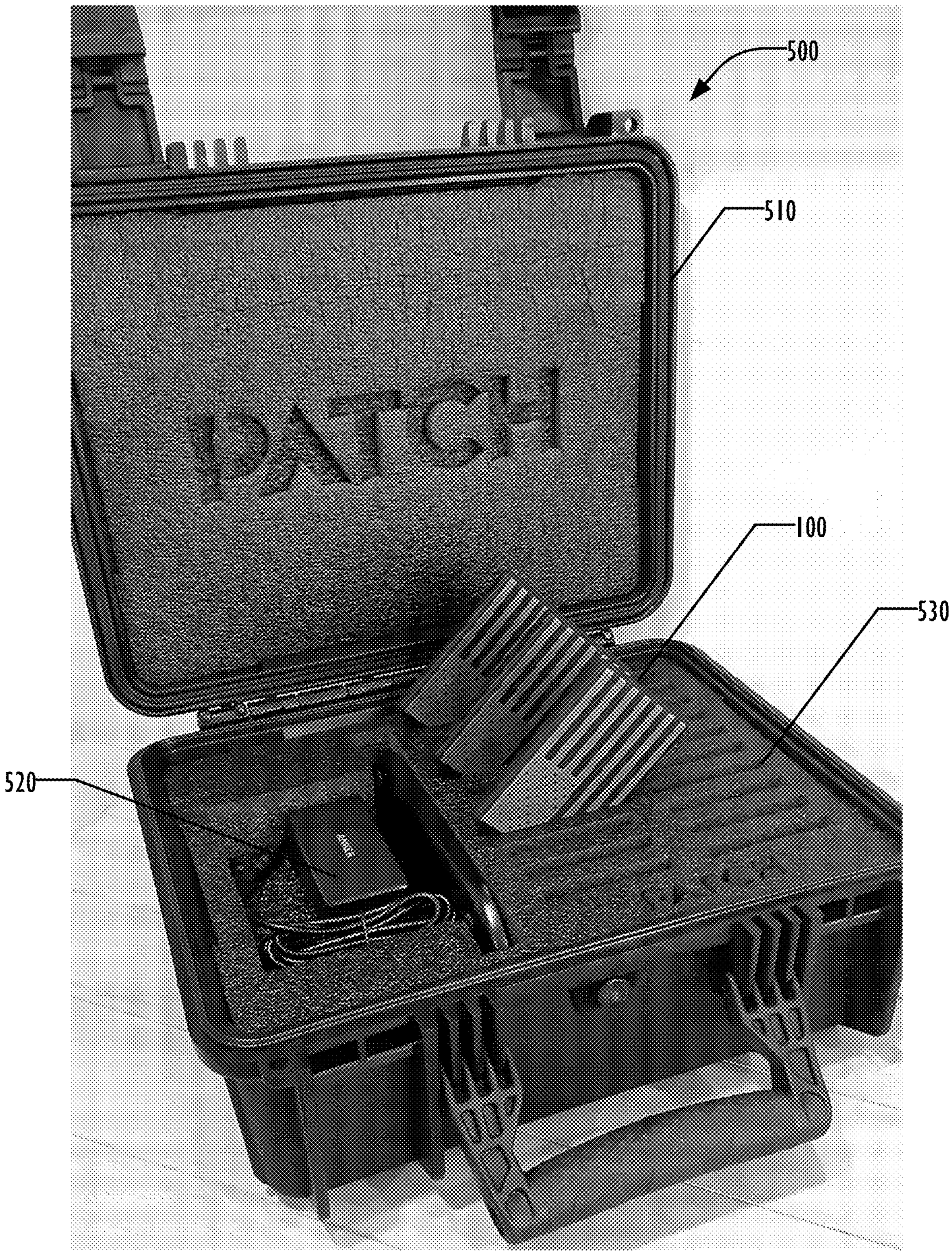
FIG. 5 is a perspective view of a carrying case for a group of programmable devices according to one embodiment.

Typically, the programmable devices 100 are stored and carried between operations in a kit 500 such as is illustrated in a perspective view in FIG. 5. The kit 500 comprises a waterproof carrying case 510 that is configured to hold a battery charger 520 and a collection of slots 530 for holding programmable devices 100. In embodiments in which the programmable devices 100 are QI-compliant, any QI-compliant battery charger may be used and no special-purpose charger is required. Preferably the battery charger 520 is a multi-pad wireless charger, allowing charging more than one device simultaneously.

Although not illustrated in FIG. 5, the kit 500 may include a place for holding one or more smartphones that are used for configuring the collection of programmable devices 100 and for monitoring the location and status of the wearers of the programmable devices 100 after configuration is complete and the programmable devices 100 are communicating on the ephemeral secure ad hoc wireless network. The kit 500 illustrated in FIG. 5 is illustrative and by way of example only. Other configurations of the carrying case 510 may be used as desired and the number of slots for the programmable devices 100 and their arrangement in the case 510 may vary as desired. In some situations, where more programmable devices 100 are needed than can fit in a single carrying case 510, multiple carrying cases may be used to provide enough programmable devices 100 for the intended operation.

Once a team arrives at a desired location with the programmable devices 100, an individual responsible for managing communications equipment configures the collection of programmable devices 100, assigning each programmable device 100 to a team member and creating a network of the programmable devices 100. In one embodiment, the individual responsible for managing communications equipment uses an optical scanner of a configuring device to scan and optically capture the optically readable device identifier 310 and uses a BLE connection to the programmable device 100 to assign network information as described in detail below. In embodiments in which the encoded device identifier is electronically readable, the individual uses the corresponding encoded device identifier reader to capture the electronically encoded device identifier. Once all of the programmable devices 100 are configured to create the ephemeral secure wireless ad hoc network, they may be worn by the person to whom the programmable device 100 is assigned. Each programmable device 100 may then communicate its sensor data, including geolocation receiver and IMU activity data, across the network. A subset of the programmable devices 100 may also be in a BLE data communication connection to a programmable device with a graphical display that is running a software application for interfacing with and controlling the network of programmable devices 100. This programmable device with a graphical display is used by the team member assigned the corresponding programmable device 100. For simplicity, the description below is written in terms of a smartphone, but other types of programmable devices with graphical displays, such as tablets, smartwatches, or laptop computers, may be used.

A software application on the smartphone then reads information broadcast by all of the programmable devices 100 in the ephemeral secure wireless ad hoc network via their long-range radio transceiver and can display information related to that data in the software application on the smartphone. The team member using the smartphone may also be able to send text messages from the software application via the BLE connection to the programmable device 100 used by that team member. The programmable device 100 then sends the message data over its long-range radio to other programmable devices 100 configured to be in the same ephemeral secure wireless ad hoc network, and those programmable devices 100 receive the message data via their long-range radio and then send the message data via BLE connection to the other team members' smartphones, where the message is displayed in the software application on the smartphone. The smartphone uses only the BLE connection to interface with the corresponding programmable device 100. Therefore, the smartphone can be in airplane mode, in which connectivity to other networks such as cellular and Wi-Fi is disabled. Thus, the network can operate in locations or situations where other means of communication such as cellular, Wi-Fi, or satellite communication are not available or should not be used due to information security concerns.

The software application on the smartphone can display information about each team member wearing an assigned programmable device 100 in multiple forms. For example, a map may be loaded into the software application of the operational area for the ephemeral secure wireless ad hoc network. The software application may then use the information received from the other programmable devices 100 to mark the location of the associated team member on the map using the received geolocation sensor data and provide an assessment of the team member's activity category or activity level based on the received IMU (accelerometer and gyroscope) sensor data. For example, the software application may flag information indicating that the team member associated with a programmable device 100 is not moving as an indication that the team member associated with that programmable device 100 is in trouble. In some embodiments, algorithms automatically monitor team member locations and activity. This enables remote wellness checks and automated alerts if a team member is outside of a designated area or shows indications of injury.

To prevent hacking and data exploitation, just as all data generated or received by the programmable device 100 is erased when the ephemeral secure wireless ad hoc network is shut down, all data related to the programmable devices 100 is erased from the smartphone when the software application is closed.

As an example use case, a team of 40 people including four team leaders are preparing for a long day of work in an outdoor environment. In this example, the team comprises a Super user, one or more Leaders, and one or more Field team members. The Super user is responsible for setting up the network and thus has a smartphone having a software application for communicating with their programmable device 100 to provide configuration information. The Leaders are team members with a smartphone having a software application for communicating with their programmable device 100 so they can monitor the location and activity of team members throughout the work day. The Field team members only have a programmable device 100. There must be one and only one Super user for each ephemeral secure wireless ad hoc network. Other users in a given network may all be Leader users, or may all be Field users, or any mix of the two, as established by the Super user during the network configuration process. In this example, there is one Super user (who becomes a Leader user once network configuration is complete); three Leader users; and 36 Field users. The names "Super user," "Leader," and "Field" are arbitrary designations for the purposes of this description and any other set of designations may be used.

The Super user opens the software application in their smartphone, downloads a map of the area they are operating in, enters their call sign, wakes up their programmable device 100 by scanning the programmable device 100's QR code, and selects the checkbox "Are you setting up the network today?" They then wake up the programmable devices 100 of their teammates and configure each programmable device 100 as a Leader programmable device 100 or a Field programmable device 100. They assign a call sign to each programmable device 100 during this configuration process.

Once all the programmable devices 100 are configured by the Super user, all the programmable devices 100 are issued to the team, and the Leaders scan the QR code on their Leader programmable device 100 to connect it to their smartphone so they can monitor the location and activity of team members throughout the work day. All team members then attach their issued programmable device 100 (Leader or Field) to the hook and loop fastener area on their vest. The Leaders text other Leaders through their respective programmable devices 100 and monitor the location and activity of everyone on the team.

In one embodiment, the following information may be broadcast by the team's programmable devices 100 and may be displayed in the software application:

user geolocation;
user activity status;
text messages; and
battery life remaining.

At the end of the workday, any Leader team member may shut down the ephemeral secure wireless ad hoc network, and the programmable devices 100 are collected so they can be recharged for the next day. All data from the network session, including configuration data and sensor data, is erased from both the programmable devices 100 and the smartphones.

Figure 6:
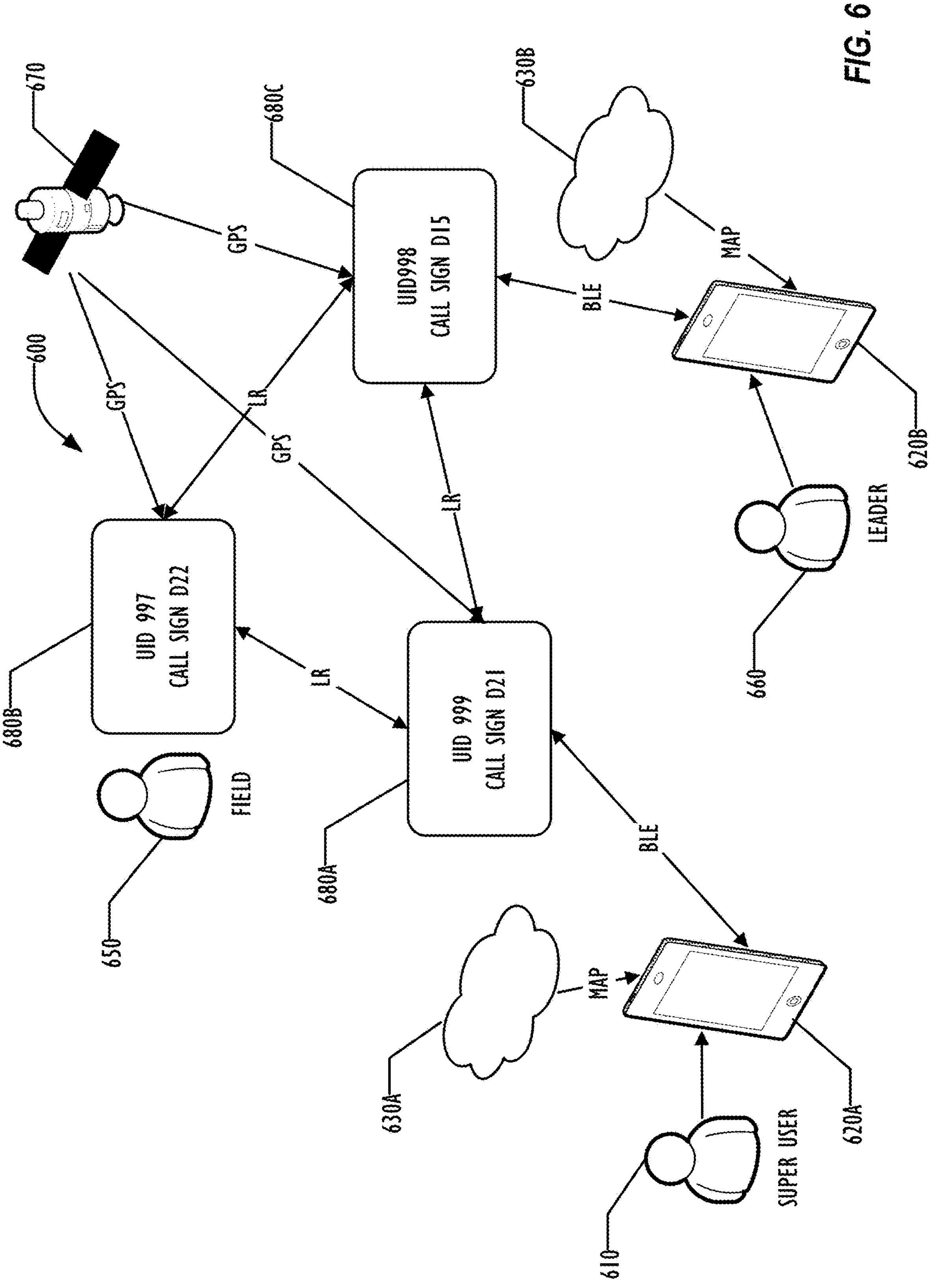
FIG. 6 is a diagram illustrating an ephemeral secure wireless ad hoc network of programmable devices according to one embodiment.

FIG. 6 is a block diagram illustrating how data is transmitted across an ephemeral secure wireless ad hoc network 600 according to one embodiment. In this example, three programmable devices 680A-C are configured into a network by Super user team member 610. Two other team members are included in this example, Leader team member 660 and Field team member 650. Super user team member 610 configures programmable device 680A, which has a UID of 999, assigning it call sign D21, programmable device 680B, which has a UID of 997, assigning it call sign D22, and programmable device 680C, which has a UID of 998, assigning it call sign D15. Programmable device 680B is designated a Field programmable device and given to Field team member 650. Programmable device 680C is designated a Leader programmable device and given to Leader team member 660. Programmable device 680A, used by Super user team member 610, is also designated a Leader programmable device, and Super user team member 610 is also a Leader team member.

Each of the programmable devices 680A-C receives geolocation and timing data from GPS satellites 670. For clarity, only a single GPS satellite 670 is illustrated in FIG. 6; however, in actual usage, the programmable devices 680A-C would each receive data from four GPS satellites 670 to enable trilateration and correction. In some embodiments, the programmable devices 680A-C may receive geolocation and timing data from multiple GNSS constellations concurrently.

As Leader team members, Super user team member 610 and Leader team member 660 use smartphones 620A and 620B, respectively, to communicate with their assigned programmable devices 680A and 680C, using BLE. This allows each Leader team member to receive battery status data, IMU data, and GPS data that each of the programmable devices 680A-C communicate using their respective long-range radio transceivers. The software applications installed on the smartphones 620A-B have previously downloaded map data from an off-site digital data storage location, such as cloud-based data repositories 630A-B. Although indicated as separate cloud-based data repositories 630A-B, both smartphones 620A and 620B may download the maps from the same cloud-based data repository. The software applications installed on the smartphones 620A-B may then display information about the status of each of team members 610, 650, and 660, such as displaying their position on the map. Leader team members 610 and 660 may also send short messages to each other by entering the message into the software application installed on their respective smartphones 620A or B. The message data is then communicated via BLE to their respective programmable devices 680A or 680C; the programmable devices 680A or 680C send the message data over their long-range radio to the receiving programmable device (680A or 680C) which then communicates the message via BLE connection to the Leader team member's smartphone (620A or 620B) where the message is displayed in the software application.

Although Super user team member 610 initially configured the ephemeral secure wireless ad hoc network 600, either the Super user team member 610 or Leader team member 660 may shut down the ephemeral secure wireless ad hoc network 600 by using the software application installed on their smartphone 620A or 620B to send a command via BLE connection to their respective programmable device 680A or 680C and that command is then sent by the long-range radio to each programmable device 680A-C. As each programmable device 680A-C shuts down, all data that was sent or received by the programmable device 680A-C is erased, including configuration data and sensor (GPS and IMU) data. In addition, as each smartphone 620A-B closes the software application, all network session information is erased on the smartphone 620A-B. As team members 610, 650, and 660 return their programmable devices 680A-C, they can be recharged and stored in the carrying case 510 for future use.

In some embodiments, the software application may allow a Leader team member to send a command to erase or shut down a select programmable device 100 or a selected plurality of programmable devices 100 without shutting down the ephemeral secure wireless ad hoc network. In some embodiments, the software application may allow a Leader team member to send other types of commands, such as a data query command, or a command to change mode or behavior to a select programmable device 100 or a selected plurality of programmable devices 100 without affecting the ephemeral secure wireless ad hoc network.

In some embodiments, the software application used to configure, manage, and monitor the programmable device 100 may also be used to conduct an over-the-air (OTA) firmware update wherein new firmware is installed on the programmable device 100. The firmware update may be downloaded to the configuring device from an on-site data storage location, such as an external hard drive, or an off-site digital data storage location, such as a cloud-based data repository. The software application then parses and communicates the firmware update to the programmable devices 100 for installation. In some embodiments, the firmware update is communicated directly from the configuring device to the programmable devices 100 using the short-range radio transceiver. In some embodiments, the configuring device uses a programmable device 100 as a relay to communicate the firmware update to another programmable device 100 using the long-range radio transceiver.

In one embodiment, each team member is assigned a call sign by the Super user team member 610. At the beginning of the network configuration process, the Super user team member 610 enters their call sign into the software application on their smartphone 620A. In one embodiment, the call sign is a three-character code, but any length of call sign or other type of user designator may be used.

Figure 7:
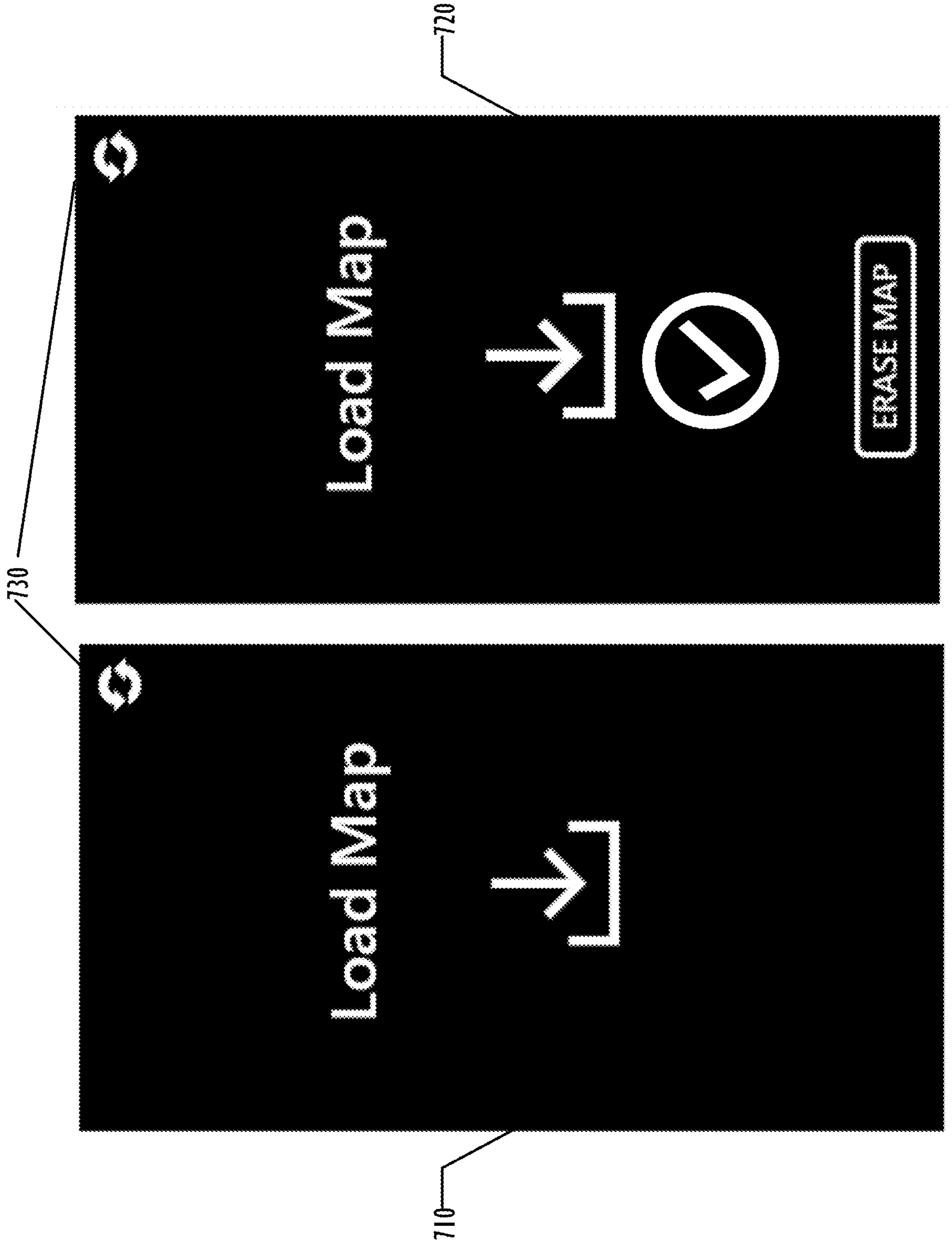
FIG. 7 is a pair of example screens used by a software application to load a map for use by the software application according to one embodiment.

First, the Super user team member 610 opens the software application on their smartphone. All smartphone displays illustrated in the figures are illustrative and by way of example only and simplified for clarity. If no map is already loaded, the software application may ask the Super user team member 610 to load a map of the working area from a pre-designated source, such as a cloud-based data repository or a local system such as a laptop computer (not shown in the figures). FIG. 7 is a pair of example screens for the software application with screen 710 inviting the user to load a map and screen 720 indicating that the map has been loaded. An indication 730 on each screen can provide a link to a procedure for loading a programmable device firmware update for installing on programmable devices 100 using any desired firmware update procedure.

The software application prompts the Super user team member 610 to scan the device identifier 310 on the programmable device 680A that the Super user team member 610 is to use. Where the encoded device identifier 310 is an optically readable indicator, such as a QR code, the smartphone's camera may be used as an optical scanner to scan the encoded device identifier 310. Where the encoded device identifier is an electronically readable indicator, the smartphone may use an NFC tag reader or another feature to electronically capture the encoded device identifier 310. The software application then sends an interrupt signal over BLE to the Super user's programmable device 680A causing the programmable device 100 to wake up from a low-power sleep state responsive to receiving the interrupt signal and transitioning the programmable device 680A to a configuration state.

The Super user team member 610 then scans each of the other programmable devices 680B-C that is to be part of the network 600 by scanning the device identifier 310 on each successive programmable device and then sending the interrupt signal over BLE to the programmable device 680B-C causing them to wake up from a low-power sleep state.

With each programmable device 680A-C, the Super user team member 610 selects the type of programmable device 680A-C that has been turned on, indicating whether that programmable device 680A-C is to be paired with a smartphone (i.e., is a Leader programmable device) or not paired with a smartphone (i.e., a Field programmable device). The Super user team member 610 then assigns a call sign to the programmable device 680A-C, before asking whether to turn on (wake up) any more programmable devices 680A-C.

After the Super user team member 610 has set up the network 600 and issued all of the other Leader users (in this example, Leader team member 660) their programmable devices 680A-C, all Leader team members (including the Super user team member 610) make a BLE connection between their smartphone and their programmable device 680A-C. To do this, each Leader team member scans the device identifier 310 on their programmable device 680A-C (in the same way the Super user team member 610 scanned the device identifier 310 to wake up their device originally) to make a BLE connection between their smartphone and their programmable device 680A-C.

Figure 8:
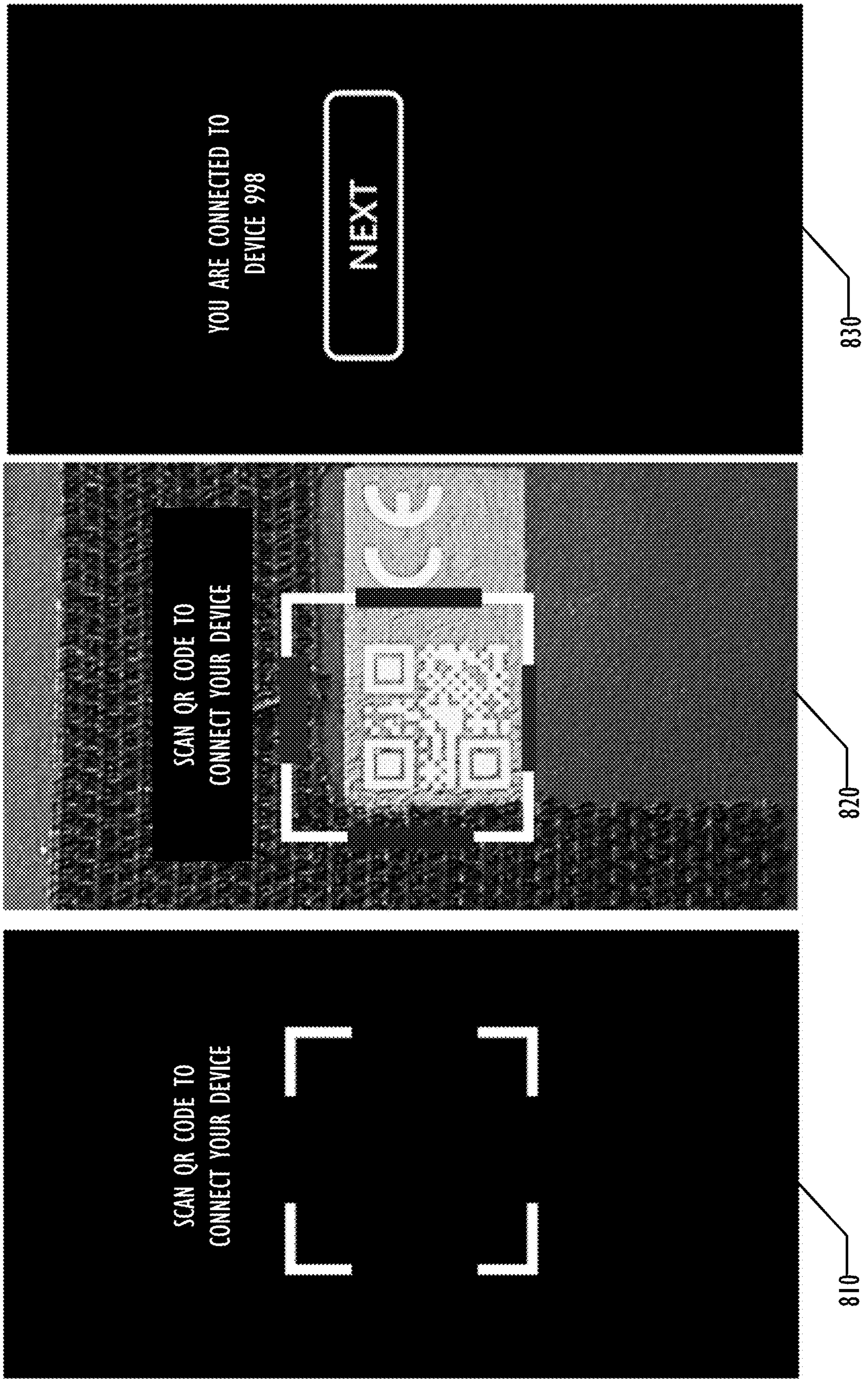
FIG. 8 is a set of three example screens used by a software application to scan an encoded device identifier from a programmable device according to one embodiment.

The software application user is prompted to scan the QR code on their programmable device 100 as illustrated in screen 810 of FIG. 8.

The software application user scans the QR code on the back of their assigned programmable device 100 as illustrated in screen 820.

When the QR code is scanned, the smartphone connects to the programmable device 100 via BLE.

Screen 830 then confirms that the smartphone is connected to the programmable device 100, displaying device identifier 310 for that programmable device, in this example 998.

Figure 9:
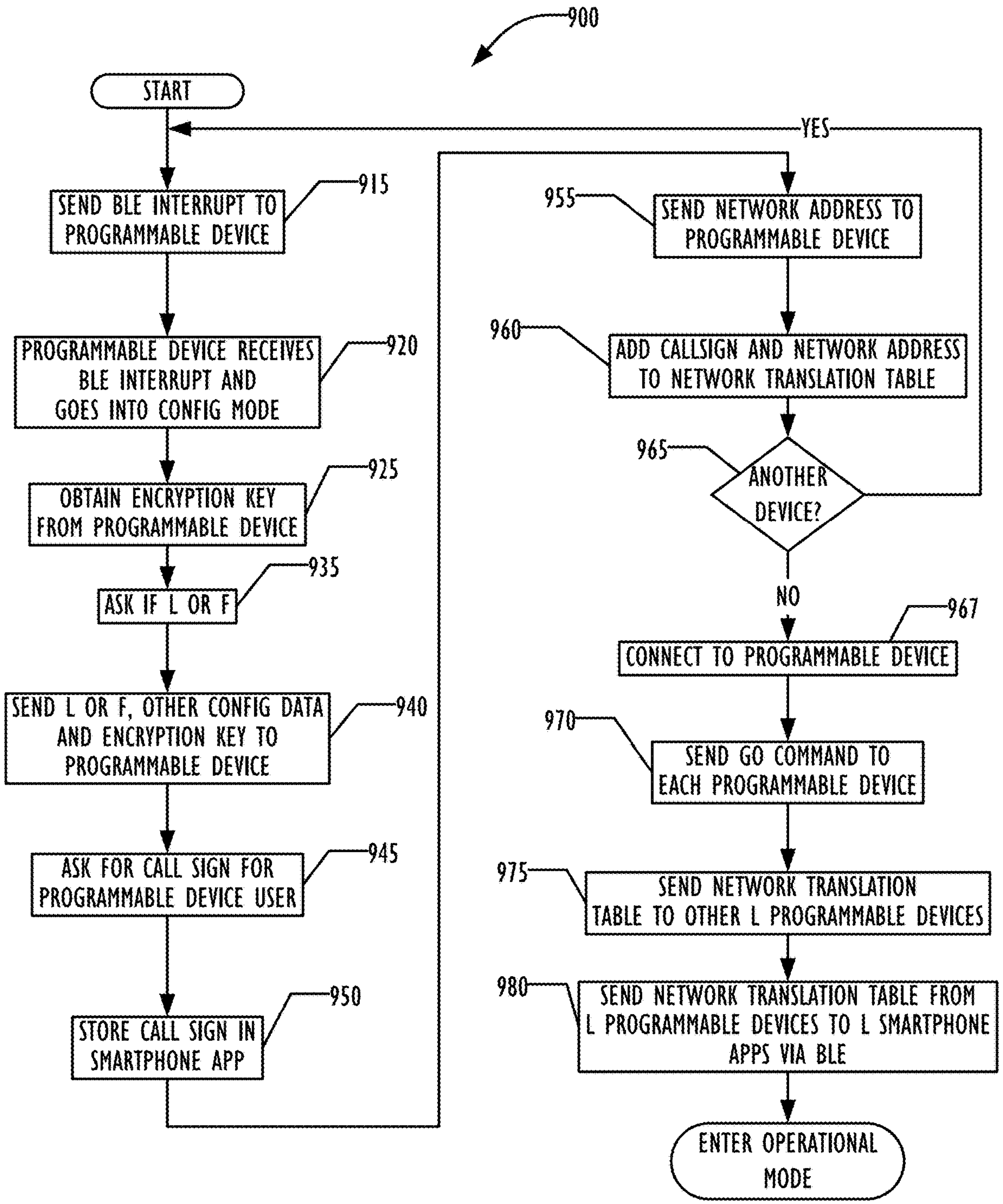
FIG. 9 is a flowchart illustrating a technique for configuring a collection of programmable devices into an ephemeral secure wireless ad hoc network according to one embodiment.

FIG. 9 is a flowchart illustrating a technique 900 for configuring a collection of programmable devices by a software application on the configuring device of a Super user team member 610 according to one embodiment in more detail. The Super user configures the programmable device assigned to the Super user team member 610 first, then configures the remaining programmable devices 100 that are assigned to Leader or Field team members. Non-Super user Leader team members and Field members are provided to those team members in an operational state. The software application on non-Leader team members simply connects to the assigned programmable device 100.

In block 915 the Super user team member 610 uses a software application to send a BLE interrupt signal to a programmable device 100, causing the programmable device 100 to wake up from a low-power sleep state. In block 920, firmware in the programmable device transitions into a configuration state upon receiving the BLE interrupt signal.

The software application then sends a BLE command in block 925 to the programmable device 100 requesting a unique encryption key for use by the network being created. The programmable device 100 generates the encryption key and sends it via BLE to the software application responsive to the request. This request happens once and only once at the beginning of each network configuration process. The encryption key is then stored in local memory on the Super user's smartphone 620A and is sent to each programmable device 100 via BLE as a part of the network configuration process.

For other programmable devices 100, the software application skips block 925 and sends the previously obtained encryption key to the programmable device 100, which then stores it in local memory for use during operation of the ephemeral secure wireless ad hoc network.

Next, the software application asks the Super user team member 610 whether the programmable device 100 being configured is to be a Leader programmable device 100 (i.e., associated with a smartphone) or a Field programmable device 100 (i.e., not associated with a smartphone) in block 935. Upon receiving input from the Super user team member 610 responding to the question, the software application in block 940 uses BLE to send to the programmable device 100 configuration information such as whether the programmable device 100 is a Leader or Field programmable device 100, the specific settings for the long-range radio in the programmable device 100, and the unique encryption key obtained in block 925. The programmable device 100 stores the information in local memory.

The smartphone app in block 945 requests the Super user team member 610 to enter a call sign for the user who will be associated with the programmable device 100. Upon receiving input with the call sign, in block 950 the smartphone app stores the call sign so it can be used to create the network translation table in block 960.

In block 955, the smartphone app assigns a network address to the programmable device 100 and sends it to the programmable device 100, which stores the network address in local memory. In one embodiment, the network address may be a simple sequential number plus an indication of whether the programmable device 100 is a Leader programmable device 100 or a Field programmable device 100.

In one embodiment, the call sign and network address for the programmable device 100 may be used to create a network translation table in block 960 that is maintained by the smartphone app.

In block 965, the Super user team member 610 is asked whether another programmable device 100 is to be configured. If another programmable device 100 is to be configured, the procedure starts over in block 915 with the next programmable device 100.

In block 967, the Super user team member smartphone connects to the associated programmable device 100 (in the example of FIG. 6, programmable devices 680A). In block 970, the Super user team member's smartphone app sends a command via BLE to each of the programmable devices 100 to complete configuration by exiting configuration state and transitioning to an operational state.

If a network translation table is in use, in block 975 the Super user team member 610's programmable device 100 may send the network translation table to all other Leader programmable devices 680A-C using the long-range radio of the Super user's programmable device 100. Each Leader programmable device 100 then uses BLE to send the network translation table to the software application running on the Leader's smartphone in block 980 where it is stored in local memory on the smartphone for the duration of the network session. The network translation table is not stored on the Leader programmable devices 100.

When configuration completes, the network programmable devices 100 are in an operational state.

Once all of the programmable devices 100 have been configured and transitioned into the operational state, the Super user and their programmable device 100 no longer have special functions and now operate as a Leader and Leader programmable device 100. Any Leader may use their smartphone to shut down the network using the smartphone app to send a shutdown command via their associated programmable device 100 over the long-range radio to all programmable devices 100 in the network, instructing the programmable device 100 to erase session information.

When each programmable device 100 receives the shutdown command, it erases all session information on the programmable device, including the encryption key, network address, and long-range radio settings, and then transitions into a low-power sleep state.

While certain example embodiments have been described in detail and shown in the accompanying drawings, it is to be understood that such embodiments are merely illustrative of and not devised without departing from the basic scope thereof, which is determined by the claims that follow.

We claim:

1. An ephemeral secure wireless ad hoc network system, comprising:
- a plurality of programmable devices, each comprising:
  - a housing, in which is disposed: a short-range radio transceiver, a long-range radio transceiver, a long-range radio antenna, and at least one sensor for data collection; and
  - an encoded device identifier, disposed with the housing; and
- a configuring device, comprising:
  - a short-range radio transceiver;
  - a reader for the encoded device identifier; and
  - a software application for execution by the configuring device, comprising instructions that when executed cause the configuring device to:
    - read the encoded device identifier associated with a given one of the programmable devices;
    - establish, based on the encoded device identifier, a data communication connection between the short-range radio transceiver of the configuring device and the short-range radio transceiver of the given programmable device;
    - send an interrupt signal via the data communication connection to the given programmable device to wake the given programmable device from a low-power sleep state to a configuration state;
    - send a request via the data communication connection to the given programmable device to generate a unique encryption key for an ephemeral secure wireless ad hoc network session;
    - receive via the data communication connection the unique encryption key from the given programmable device responsive to the request:
    - send configuration information to the given programmable device via the data communication connection; and
    - send a command to the given programmable device from the configuring device via the data communication connection, causing the given programmable device to transition from the configuration state to an operational state, the given programmable device in the operational state being configured to use the long-range radio transceiver in the ephemeral secure wireless ad hoc network session with others of the programmable devices.

2. The ephemeral secure wireless ad hoc network system of claim 1, wherein the configuring device is a smartphone; and wherein the reader for the encoded device identifier is a camera of the smartphone.

3. The ephemeral secure wireless ad hoc network system of claim 1, wherein the encoded device identifier is a barcode.

4. The ephemeral secure wireless ad hoc network system of claim 1, wherein the configuration information comprises long-range radio settings for the given programmable device.

5. The ephemeral secure wireless ad hoc network system of claim 1, wherein the given programmable device is programmed to generate the unique encryption key responsive to the request.

6. The ephemeral secure wireless ad hoc network system of claim 1, wherein the instructions further comprise instructions that when executed cause the configuring device to erase any session information upon closing the software application.

7. The ephemeral secure wireless ad hoc network system of claim 1, wherein the instructions further comprise instructions that when executed cause the configuring device to send another command to the given programmable device to shut down the ephemeral secure wireless ad hoc network session.

8. The ephemeral secure wireless ad hoc network system of claim 1, wherein the instructions further comprise instructions that when executed cause the configuring device to assign a given network address to the given programmable device; and wherein the configuration information comprises the given network address.

9. The ephemeral secure wireless ad hoc network system of claim 1, wherein the instructions further comprise instructions that when executed cause the configuring device to:
- read the encoded device identifier associated with a subsequent one of the programmable devices;

establish, based on the encoded device identifier, a respective data communication connection between the short-range radio transceiver of the configuring device and the short-range radio transceiver of the subsequent programmable device;

send a respective interrupt signal via the respective data communication connection to the subsequent programmable device to wake from the low-power sleep state to the configuration state;

assign a respective network address to the subsequent programmable device;

send respective configuration information to the subsequent programmable device via the respective data communication connection, the respective configuration information including the respective network address and the unique encryption key for the ephemeral secure wireless ad hoc network session; and send a respective command to the subsequent programmable device from the configuring device via the respective data communication connection, causing the subsequent programmable device to transition from the configuration state to an operational state, the subsequent programmable device in the operational state being configured to use the long-range radio transceiver in the ephemeral secure wireless ad hoc network session with the given programmable device.

10. The ephemeral secure wireless ad hoc network system of claim 9, wherein the configuring device comprises a user input device; and wherein the instructions further comprise instructions that when executed cause the configuring device to obtain user input with the user input device, wherein the subsequent configuration data sent to the subsequent programmable device includes a positive indication or a negative indication of the user input, wherein the subsequent programmable device having the positive indication is configured to communicate with software of a user device; and wherein the subsequent programmable device having the negative indication is not configured to communicate with software of a user device.

11. A method, comprising:

reading by a configuring device an encoded device identifier disposed with a housing of a given one of a plurality of programmable devices;

establishing a data communication connection between the configuring device and the given programmable device based on the encoded device identifier;

sending an interrupt signal via the data communication connection from the configuring device to the given programmable device, the interrupt signal being configured to wake the given programmable device from a low-power sleep state responsive to receiving the interrupt signal and transition the given programmable device into a configuration state;

sending a request via the data communication connection from the configuring device to the given programmable device to generate a unique encryption key for an ephemeral secure wireless ad hoc network session;

receiving, at the configuring device via the data communication connection, the unique encryption key responsive to the request;

sending configuration information via the data communication connection from the configuring device to the given programmable device; and sending a command via the data communication connection from the configuring device to the given programmable device, causing the given programmable device to complete configuration and transition to an operational state, the given programmable device in the operational state being configured to use a long-range radio transceiver in the ephemeral secure wireless ad hoc network session with others of the programmable devices.

12. A non-transitory memory having a software application stored thereon, the software application comprising instructions that when executed cause the configuring device to perform the method of claim 11.

13. The method of claim 11, wherein the data communication connection uses a short-range radio to form a personal area network between the given programmable device and the configuring device.

14. The method of claim 11, wherein the configuration information comprises long-range radio settings for the given programmable device.

15. The method of claim 11, further comprising erasing the configuration information and all other session information by the given programmable device upon receiving another command to shut down the ephemeral secure wireless ad hoc network session.

16. The method of claim 11, further comprising assigning, at the configuring device, a network address for the given programmable device, wherein the configuration information comprises the network address.

17. The method of claim 11, comprising:

reading by the configuring device a respective encoded device identifier associated with a subsequent one of the programmable devices;

establishing, based on the respective encoded device identifier, a respective data communication connection between a short-range radio transceiver of the configuring device and the subsequent programmable device;

sending a respective interrupt signal via the data communication connection from the configuring device to the subsequent programmable device, the respective interrupt signal being configured to wake the subsequent programmable device from the low-power sleep state to the configuration state;

assigning a respective network address to the subsequent programmable device;

sending respective configuration information via the respective data communication connection from the configuring device to the subsequent programmable device, the respective configuration information including the respective network address and the unique encryption key for the ephemeral secure wireless ad hoc network session; and sending a respective command via the respective data communication connection from the configuring device to the subsequent programmable device, causing the subsequent programmable device to transition from the configuration state to the operational state, the subsequent programmable device in the operational state being configured to use the long-range radio transceiver in the ephemeral secure wireless ad hoc network session with the given programmable device.

18. An ephemeral secure wireless ad hoc network system, comprising:

a plurality of programmable devices, each comprising:

a housing, in which is disposed: a processor, a short-range radio transceiver, a long-range radio transceiver, a long-range radio antenna, and at least one sensor for data collection; and an encoded device identifier disposed with the housing and encoding wireless interconnection information for the short-range radio transceiver, wherein the processor of a given one of the programmable devices is configured to:

establish a data communication connection of the short-range radio transceiver with a configuring device based on the wireless interconnection information for the given programmable device;

receive an interrupt signal via the data communication connection and wake the given programmable device from a low-power sleep state to a configuration state in response to the interrupt signal;

receive a request via the data communication connection, generate a unique encryption key for an ephemeral secure wireless ad hoc network session in response to the request, and send the unique encryption key to the configuring device via the data communication connection;

receive configuration information from the configuring device via the data communication connection and configure operation of the long-range radio transceiver based on the configuration information; and receive a command from the configuring device via the data communication connection and transition the given programmable device from the configuration state to an operational state in response to the command, the given programmable device in the operational state being configured to use the long-range radio transceiver in the ephemeral secure wireless ad hoc network session with others of the programmable devices.

19. The ephemeral secure wireless ad hoc network system of claim 18, wherein the processor of each subsequent one of the programmable devices is configured to:

establish a respective data communication connection of the short-range radio transceiver with the configuring device based on the wireless interconnection information for the subsequent programmable device;

receive a respective interrupt signal via the respective data communication connection and wake the subsequent programmable device from the low-power sleep state to the configuration state in response to the respective interrupt signal;

receive respective configuration information from the configuring device via the data communication connection and configure operation of the long-range radio transceiver based on the configuration information, the respective configuration information including the unique encryption key for the ephemeral secure wireless ad hoc network session; and receive a respective command from the configuring device via the respective data communication connection and transition the subsequent programmable device from the configuration state to the operational state in response to the respective command, the subsequent programmable device in the operational state being configured to use the long-range radio transceiver in the ephemeral secure wireless ad hoc network session with others of the programmable devices.

20. A method, comprising:

configuring an ephemeral secure wireless ad hoc network for a plurality of programmable devices by:

establishing a data communication connection of a short-range radio transceiver of a given one of the programmable device with a configuring device based on wireless interconnection information encoded for the given programmable device;

receiving an interrupt signal via the data communication connection and waking the given programmable device from a low-power sleep state to a configuration state in response to the interrupt signal;

receiving a request via the data communication connection, generating a unique encryption key for an ephemeral secure wireless ad hoc network session in response to the request, and sending the unique encryption key to the configuring device via the data communication connection;

receiving configuration information from the configuring device via the data communication connection and configuring operation of a long-range radio transceiver of the given programmable device based on the configuration information; and receiving a command from the configuring device via the data communication connection and transitioning the given programmable device from the configuration state to an operational state in response to the command, the given programmable device in the operational state being configured to use the long-range radio transceiver in the ephemeral secure wireless ad hoc network session with others of the programmable devices.

21. The method of claim 20, further comprising adding each subsequent one of the programmable devices to the ephemeral secure wireless ad hoc network by:

establishing a respective data communication connection of a respective short-range radio transceiver with the configuring device based on respective wireless interconnection information encoded for the subsequent programmable device;

receiving a respective interrupt signal via the respective data communication connection and waking the subsequent programmable device from the low-power sleep state to the configuration state in response to the respective interrupt signal;

receiving respective configuration information from the configuring device via the respective data communication connection and configuring operation of a respective long-range radio transceiver based on the configuration information, the respective configuration information including the unique encryption key for the ephemeral secure wireless ad hoc network session; and receiving a respective command from the configuring device via the respective data communication connection and transitioning the subsequent programmable device from the configuration state to the operational state in response to the respective command, the subsequent programmable device in the operational state being configured to use the long-range radio transceiver in the ephemeral secure wireless ad hoc network session with others of the programmable devices.

22. A non-transitory memory having program instructions stored thereon for causing the programmable devices to perform the method of claim 20.

* * * * *